United States Patent
Eom et al.

(10) Patent No.: US 11,965,990 B2
(45) Date of Patent: Apr. 23, 2024

(54) LIDAR SENSOR DEVICE AND METHOD OF TRANSMITTING LASER SIGNAL

(71) Applicant: RESEARCH COOPERATION FOUNDATION OF YEUNGNAM UNIVERSITY, Gyeongsangbuk-do (KR)

(72) Inventors: Jeong Sook Eom, Gyeongsangbuk-do (KR); Gun Zung Kim, Daegu (KR); Yong Wan Park, Daegu (KR)

(73) Assignee: RESEARCH COOPERATION FOUNDATION OF YEUNGNAM UNIVERSITY, Gyeongsangbuk-Do (KR)

(*) Notice: Subject to any disclaimer, the term of this patent is extended or adjusted under 35 U.S.C. 154(b) by 333 days.

(21) Appl. No.: 17/298,749

(22) PCT Filed: Dec. 30, 2020

(86) PCT No.: PCT/KR2020/019382
§ 371 (c)(1),
(2) Date: Jun. 1, 2021

(87) PCT Pub. No.: WO2022/145534
PCT Pub. Date: Jul. 7, 2022

(65) Prior Publication Data
US 2023/0305122 A1    Sep. 28, 2023

(30) Foreign Application Priority Data
Dec. 30, 2020   (KR) .................. 10-2020-0187140

(51) Int. Cl.
G01C 3/08    (2006.01)
G01S 7/4911  (2020.01)
G01S 7/484   (2006.01)

(52) U.S. Cl.
CPC ............. *G01S 7/4911* (2013.01); *G01S 7/484* (2013.01)

(58) Field of Classification Search
CPC .................... G01S 7/4911; G01S 7/484
See application file for complete search history.

(56) References Cited

U.S. PATENT DOCUMENTS

| 4,939,439 A | 7/1990 | Dalglish |
| 10,845,474 B1 | 11/2020 | Riley et al. |
| (Continued) | | |

FOREIGN PATENT DOCUMENTS

| CN | 104009954 A | 8/2014 | |
| CN | 109541629 A * | 3/2019 | ........... G01C 15/002 |
| (Continued) | | | |

OTHER PUBLICATIONS

International Search Report for PCT/KR2020/019382 dated Sep. 28, 2021.

(Continued)

*Primary Examiner* — Mark Hellner
(74) *Attorney, Agent, or Firm* — The PL Law Group, PLLC

(57) ABSTRACT

A lidar sensor device according to an embodiment includes a data generation unit that generates light identification data, an optical modulation unit that generates a plurality of modulated signals for the optical identification data by performing orthogonal frequency division multiplexing (OFDM) modulation on the optical identification data and generates a plurality of laser signals respectively corresponding to the plurality of modulated signals and having different frequencies, and a transmission unit that simultaneously transmits the plurality of laser signals to different measurement points according to the frequencies, respectively.

15 Claims, 7 Drawing Sheets

(56) References Cited

U.S. PATENT DOCUMENTS

| | | | |
|---|---|---|---|
| 2007/0285649 A1 | 12/2007 | Nakamura | |
| 2011/0229147 A1 | 9/2011 | Yokoi | |
| 2011/0279366 A1* | 11/2011 | Lohbihler | B25J 13/089 |
| | | | 702/158 |
| 2019/0257927 A1 | 8/2019 | Yao | |

FOREIGN PATENT DOCUMENTS

| | | | | |
|---|---|---|---|---|
| JP | 2005-315820 A | | 11/2005 | |
| JP | 2005315820 A | * | 11/2005 | ............ G01S 7/285 |
| JP | 2007-327840 A | | 12/2007 | |
| JP | 2010-130029 A | | 6/2010 | |
| KR | 10-2000-0064841 A | | 11/2000 | |
| KR | 10-2017-0037394 A | | 4/2017 | |
| KR | 10-1896477 B1 | | 9/2018 | |
| WO | WO 97/41460 A2 | | 11/1997 | |

OTHER PUBLICATIONS

Office action dated Apr. 6, 2021 from Korean Patent Office in a counterpart Korean Patent Application No. 10-2020-0187140 (all the cited references are listed in this IDS.) (English translation is also submitted herewith.).

Notice of Allowance dated Jul. 29, 2021 from Korean Patent Office in a counterpart Korean Patent Application No. 10-2020-0187140 (all the cited references are listed in this IDS.) (English translation is also submitted herewith.).

Office action issued on Apr. 4, 2023 from Japan Intellectual Property Office in a counterpart Japanese Patent Application No. 2021-575478 (all the cited references are listed in this IDS.) (English translation is also submitted herewith.).

Office action issued on Aug. 8, 2023 from Japan Intellectual Property Office in a counterpart Japanese Patent Application No. 2021-575478 (all the cited references are listed in this IDS.) (English translation is also submitted herewith.).

Zhou, J. et al., "An improved scheme for Flip-OFDM based on Hartley transform in short-range IM/DD systems", Optics Express, 2014 , vol. 22, No. 17, pp. 20748-20756 <DOI: 10.1364/OE.22.020748 >.

Florea, Catalin et al., "Broadband beam steering using chalcogenide-based Risley prisms", Optical Engineering, 2011, vol. 50, No. 3, Article 033001, 5 Pages <doi.org/10.1117/1.3551503>.

* cited by examiner

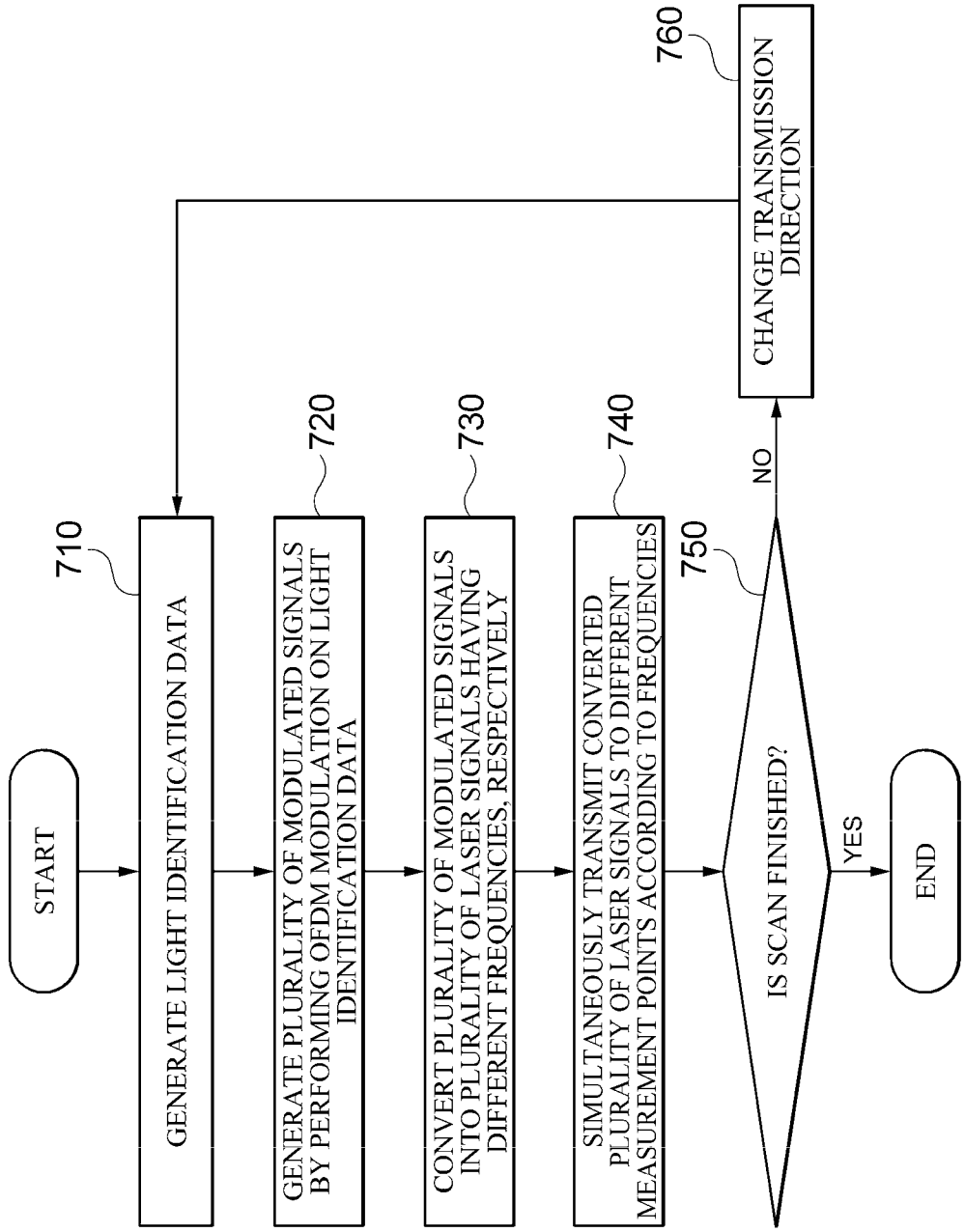

LIDAR SENSOR DEVICE AND METHOD OF TRANSMITTING LASER SIGNAL

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/019382, filed Dec. 30, 2020, which claims priority to the benefit of Korean Patent Application No. 10-2020-0187140 filed in the Korean Intellectual Property Office on Dec. 30, 2020, the entire contents of which are incorporated herein by reference.

BACKGROUND

1. Technical Field

The disclosed embodiments relate to a LIDAR sensor technology.

2. Background Art

Apparatuses operating The LIDAR sensor is used as an essential sensor for recognizing the surrounding environment in most future mobility systems, such as autonomous traveling vehicles, autonomous walking robots, and autonomous flying drones, by providing 3D distance image information.

The LIDAR sensor transmits a laser signal to a point where distance measurement is desired, and then determines whether or not a laser signal having predetermined intensity or higher is detected. When the laser signal having the predetermined intensity or higher is detected, the LIDAR sensor calculates the time-of-flight (ToF) of the laser signal based on a difference between a point in time when the laser signal is transmitted and a point in time when the laser signal is detected, and then converts the ToF into a distance.

In this case, the LIDAR sensor can only grasp the intensity or frequency of the received laser signal, and thus the LIDAR cannot distinguish whether the received laser signal is a signal transmitted from itself or another LIDAR. Due to this, the laser signal transmitted from another LIDAR sensor using a laser signal having a frequency may be received, and thus mutual interference may occur. In addition, there is a possibility that a malicious third party may cause a malfunction of the LIDAR sensor by using this mutual interference phenomenon.

SUMMARY

Disclosed embodiments are to provide a LIDAR sensor device and a method of transmitting a laser signal.

A LIDAR sensor device according to an embodiment includes: a data generation unit that generates light identification data; an optical modulation unit that generates a plurality of modulated signals for the optical identification data by performing orthogonal frequency division multiplexing (OFDM) modulation on the optical identification data, and generates a plurality of laser signals respectively corresponding to the plurality of modulated signals and having different frequencies; and a transmission unit that simultaneously transmits the plurality of laser signals to different measurement points according to the frequencies, respectively.

The optical modulation unit may randomly select N (where, N is a natural number of 0<N≤S) subcarrier frequencies among S (where S is a natural number of S>2) available subcarrier frequencies, and generate each of the plurality of modulated signals by performing OFDM modulation on the optical identification data using N subcarrier signals respectively corresponding to the N subcarrier frequencies.

The optical modulation unit may generate the plurality of modulated signals by performing fast Hartley transform (FHT)-based flip-OFDM modulation on the optical identification data.

The plurality of modulated signals may include a zero-padding region having a length greater than or equal to a time required to change a transmission direction of the plurality of laser signals.

The transmission unit may include an optical coupler that combines the plurality of laser signals; and a Risley prism onto which the plurality of laser signals combined by the optical coupler are incident and which transmits the plurality of laser signals by refracting the plurality of laser signals at different angles depending on the frequency.

The transmission unit may change a transmission direction of the plurality of laser signals by changing at least one of a rotation angle of the Risley prism using a central axis of the Risley prism as the rotation axis and a direction of the central axis.

The data generation unit may generate new light identification data when the transmission direction is changed.

The optical identification data may include first identification data randomly generated as the transmission direction is changed.

The optical identification data may further include second identification data maintained irrespective of a change in the transmission direction.

The data generation unit may encrypt the optical identification data, and the optical modulation unit may generate the plurality of modulated signals by performing the OFDM modulation on the encrypted optical identification data.

A method of transmitting a laser signal includes: (a) generating light identification data; (b) generating a plurality of modulated signals for the optical identification data by performing orthogonal frequency division multiplexing (OFDM) modulation on the optical identification data, (c) generating a plurality of laser signals respectively corresponding to the plurality of modulated signals and having different frequencies; and (d) simultaneously transmitting the plurality of laser signals to different measurement points according to the frequencies, respectively.

In the step (b), N (where, N is a natural number of 0<N≤S) subcarrier frequencies may be randomly selected among S (where S is a natural number of S>2) available subcarrier frequencies, and each of the plurality of modulated signals may be generated by performing OFDM modulation on the optical identification data using N subcarrier signals respectively corresponding to the N subcarrier frequencies.

In the step (b), the plurality of modulated signals may be generated by performing fast Hartley transform (FHT)-based flip-OFDM modulation on the optical identification data.

The plurality of modulated signals may include a zero-padding region having a length greater than or equal to a time required to change a transmission direction of the plurality of laser signals.

The step (d) may include a step of combining the plurality of laser signals using an optical coupler; and a step of transmitting the plurality of laser signals combined by the optical coupler by refracting the plurality of laser signals at different angles depending on the frequency using a Risley prism.

The method of transmitting the laser signal may further include (e) a step of changing a transmission direction of the plurality of laser signals by changing at least one of a rotation angle of the Risley prism using a central axis of the Risley prism as the rotation and a direction of the central axis, after the step (d).

The method of transmitting the laser signal may further include a step of generating new light identification data when the transmission direction is changed, and the (b) to (d) steps may be performed on the new light identification data.

The optical identification data may include first identification data randomly generated as the transmission direction is changed.

The optical identification data may further include second identification data maintained irrespective of a change in the transmission direction.

The (a) step may include a step of encrypting the optical identification data and, in the (b) step, the plurality of modulated signals may be generated by performing the OFDM modulation on the encrypted optical identification data.

After generating a plurality of modulated signals by modulating optical identification data through OFDM modulation, the generated modulated signals can be respectively converted into laser signals having different frequencies and simultaneously transmitted in different measurement directions, and thus the mutual interference phenomenon between laser signals simultaneously transmitted or laser signals transmitted by other LIDAR sensor devices can be prevented.

In addition, since optical identification data is changed as a transmission direction of the laser signal changes, the transmission direction of the laser signal corresponding to a reflected signal received as the transmitted laser signal is reflected back can be specified by using the light identification data included in the received reflected signal. Accordingly, since the laser signal can be transmitted by changing the transmission direction irrespective of whether or not the reflected signal for the transmitted laser signal is received, the latency for distance measurement can be reduced.

BRIEF DESCRIPTION OF THE DRAWINGS

FIG. 7 is a flowchart of a method of transmitting a laser signal according to an embodiment.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the present invention is not limited thereto.

In describing the embodiments of the present invention, when it is determined that a detailed description of related known technologies related to the present invention may unnecessarily obscure the subject matter of the present invention, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing the embodiments of the present invention, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
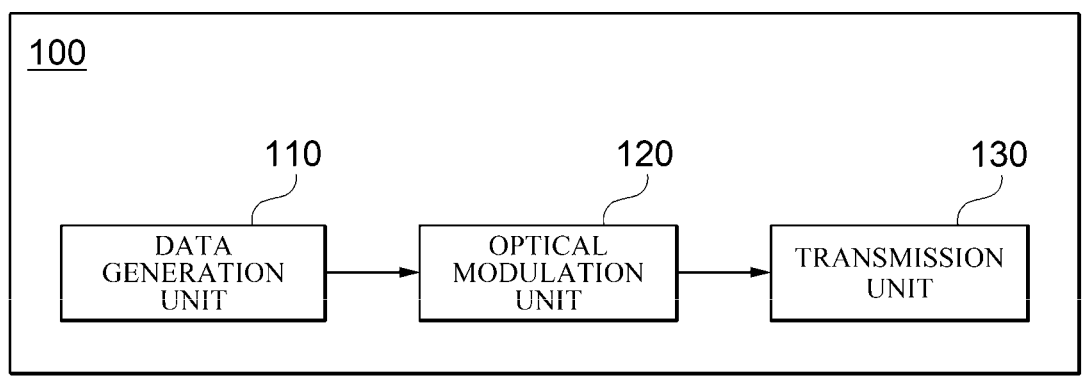
FIG. 1 is a configuration diagram of a light detection and ranging (LIDAR) sensor device according to an embodiment.

FIG. 1 is a configuration diagram of a light detection and ranging (LIDAR) sensor device according to an embodiment.

Referring to FIG. 1, the LIDAR sensor device 100 according to an embodiment includes a data generation unit 110, an optical modulation unit 120, an optical coupler 130, and a transmission unit 140.

The LIDAR sensor device 100 according to an embodiment is a device for and for grasping the surrounding environment by simultaneously transmitting a plurality of laser signals to different measurement points while changing a transmission direction and using a signal being obtained as each of the plurality of laser signals simultaneously transmitted is reflected back from an object.

The data generation unit 110 generates light identification data.

The optical identification data may be data for distinguishing a plurality of laser signals simultaneously transmitted toward different measuring points by the sensor device 100 with a specific transmission direction as a reference from a laser signal transmitted by the sensor device 100 with a different transmission direction as a reference or a laser signal transmitted by another LIDAR sensor device 100.

Specifically, according to an embodiment, the optical identification data may include first identification data randomly generated as the transmission direction of the plurality of laser signals simultaneously transmitted toward different measurement points is changed. That is, the data generator 110 may generate any first identification data each time when the transmission direction of the plurality of laser signals simultaneously transmitted is changed.

Meanwhile, according to an embodiment, the optical identification data may further include second identification data that is kept constant irrespective of a measurement direction of the plurality of laser signals simultaneously transmitted. In this case, the second identification data may be, for example, data that is randomly generated at a time when the LIDAR sensor device 100 starts a scan operation using a laser signal and does not change until the scan operation ends. As another example, the second identification data may be data that is pre-allocated to the LIDAR sensor device 100 and does not change, such as device identification information of the LIDAR sensor device 100.

According to an embodiment, the data generation unit 110 may encrypt the generated light identification data after generating the light identification data. Specifically, the data generation unit 110 may encrypt optical identification data using, for example, a symmetric key-based encryption algorithm such as an advanced encryption standard (AES) algorithm and a data encryption standard (DES) algorithm.

The optical modulation unit 120 generates a plurality of modulated signals for the optical identification data by performing orthogonal frequency division multiplexing (OFDM) modulation on the optical identification data generated by the data generation unit 110. In this case, according to an embodiment, when the optical identification data is encrypted by the data generation unit 110, the optical identification data used for modulation may be optical identification data encrypted by the data generation unit 110.

Meanwhile, the plurality of modulated signals generated by the optical modulation unit 120 may be generated using different subcarrier sets, respectively.

Specifically, the optical modulation unit 120 may randomly select N where, N is a natural number of 0<N<S) subcarrier frequencies among S (where S is a natural number of S>2) preset available subcarrier frequencies and generate each of the plurality of modulated signals for the optical identification data by performing OFDM modulation on the optical identification data using N subcarrier signals respectively corresponding to the N subcarrier frequencies. In this case, the N subcarrier frequencies randomly selected to generate each modulated signal may be different for each modulated signal.

For example, assuming that two modulated signals are generated for optical identification data by using 32 subcarrier frequencies randomly selected among 1024 available subcarrier frequencies, the optical modulation unit 120 can generate one modulated signal for the optical identification data by randomly selecting 32 subcarrier frequencies among the available subcarrier frequencies and performing OFDM modulation on the optical identification data. In addition, the optical modulation unit 120 may generate the other modulated signal for the optical identification data by randomly selecting 32 subcarrier frequencies among the available subcarrier frequencies and performing OFDM modulation on the optical identification data).

Meanwhile, after generating the plurality of modulated signals for the optical identification data, the optical modulation unit 120 generates a plurality of laser signals respectively corresponding to the plurality of generated modulated signals and having different frequencies.

Specifically, the optical modulation unit 120 may convert the plurality of generated modulated signals into laser signals having different frequencies, respectively. For example, when the number of modulated signals generated for the optical identification data is three, the optical modulator 120 may generate three laser signals corresponding to the modulated signals, and the three generated laser signals may have different frequencies, respectively.

The transmission unit 130 simultaneously transmits the plurality of laser signals generated by the optical modulation unit 120 to different measurement points according to the frequencies, respectively.

Figure 2:
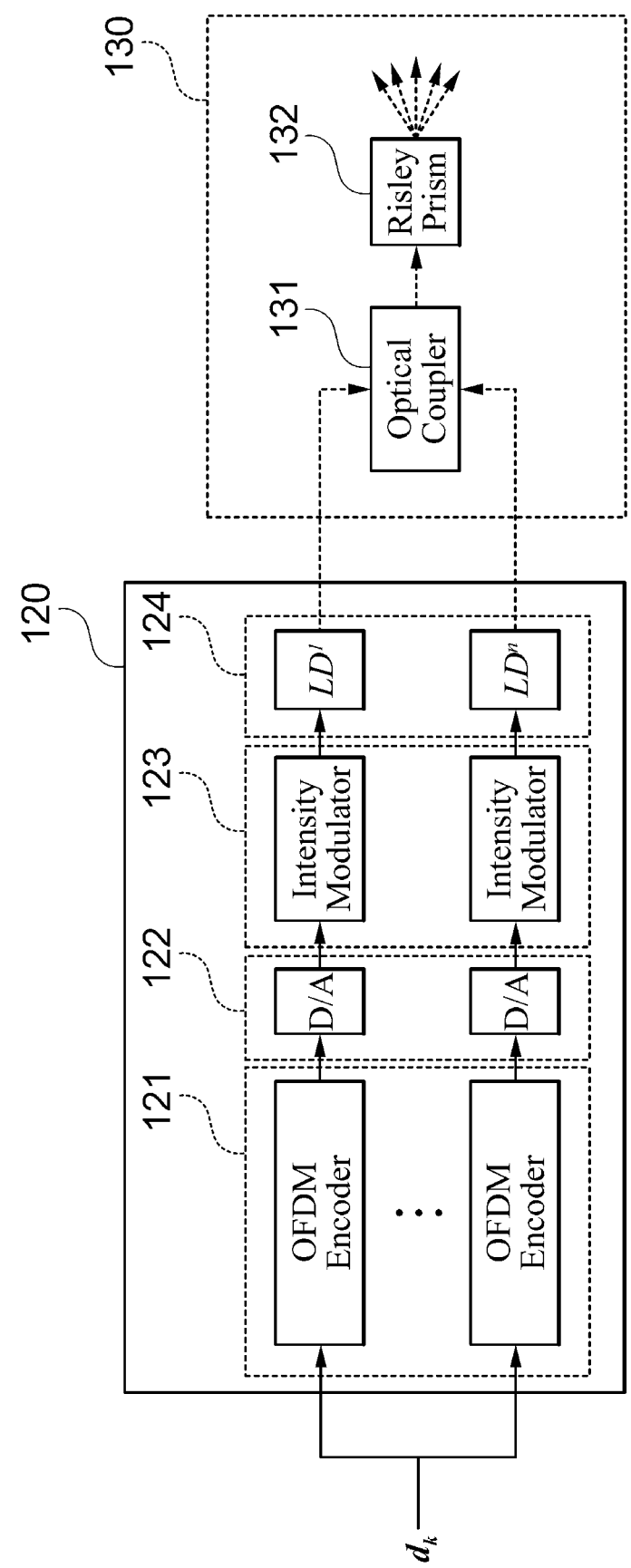
FIG. 2 is a diagram illustrating a detailed configuration of an optical modulation unit and a transmission unit according to an embodiment.

FIG. 2 is a diagram illustrating a detailed configuration of the optical modulation unit 120 and the transmission unit 130 according to an embodiment.

Referring to FIG. 2, the optical modulation unit 120 according to an embodiment may include a plurality of OFDM encoders 121 each of which generates an OFDM symbol for input optical identification data $d_k$, (=that are respectively input, digital/analog (D/A) converters 122 that convert the OFDM symbol generated by each OFDM encoder 121 into an analog signal, a plurality of intensity modulators 123 that perform intensity modulation on the analog signals converted by each D/A converter 122, and a plurality of laser diodes 124 that generate a laser signal by receiving a signal modulated by a corresponding intensity modulator among the plurality of intensity modulators 123, but generates the laser signal having a different frequency.

According to an embodiment, each of the plurality of OFDM encoders 121 may perform fast Hartley transform (FHT)-based flip OFDM modulation on the optical identification data.

Figure 3:
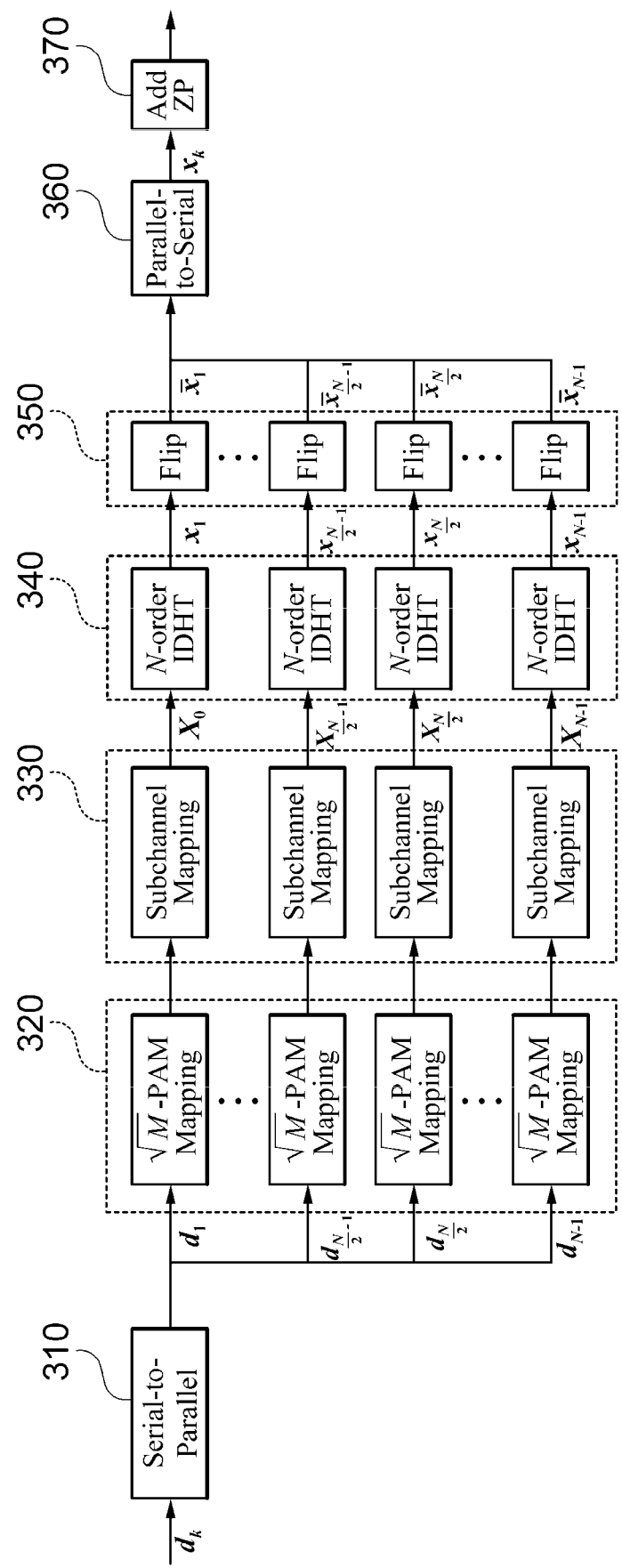
FIG. 3 is a diagram illustrating a modulation process performed by each of a plurality of OFDM encoders according to an embodiment.

Specifically, FIG. 3 is a diagram illustrating a modulation process performed by each of the plurality of OFDM encoders 121 according to an embodiment.

Referring to FIG. 3, first, each OFDM encoder 121 may convert optical identification data $d_k$ into parallel data through serial-parallel conversion 310, and then divide the optical identification data into a plurality of blocks according to the number of subcarriers to be used for modulation. For example, when the size of the optical identification data is 256 bits and the number of subcarriers is 32 (i.e., N=32), the optical identification data converted to parallel data may be divided into 32 blocks of 8-bit size.

Thereafter, each OFDM encoder 121 may generate M PAM symbols for each divided block by performing modulation on each divided block using a M-pulse amplitude modulation (M-PAM) 320. In this case, M may vary according to the size of each divided block. For example, when the size of the block is 8 bits, M may be 4 (i.e., 4-PAM).

Thereafter, each OFDM encoder 121 may generate N time domain symbols by performing inverse discrete Hartley transform (IDHT) 340 after sequentially mapping 330 the PAM symbols generated for each block to N subcarriers having different frequencies. In this case, the frequency of each of the N subcarriers may be randomly selected among the S available subcarrier frequencies set in advance.

Thereafter, each OFDM encoder 121 performs flip 350 on the N time domain symbols generated through the IDHT 340. Specifically, each OFDM encoder 121 may perform the flip 350 by converting the negative portion of the 0-th symbol to the (N/2−1)th symbol to 0, converting the positive portion of the N/2-th to (N−1)-th symbols to 0, and converting the negative portion to an absolute value.

Thereafter, each OFDM encoder 121 may generate one symbol stream by sequentially connecting the N time domain symbols on which the flip 350 has been performed after performing parallel-serial conversion 360 on the N time domain symbols.

Thereafter, each encoder 121 may perform zero padding (ZP) 370 to add a zero-padding region composed of zero values to the rear portion of the symbol stream.

In this case, according to an embodiment, the zero-padding region may have a length greater than or equal to the time required to change the transmission direction of the plurality of laser signals simultaneously transmitted toward different measurement points.

Referring back to FIG. 2, the transmission unit 130 may include an optical coupler 131 and a Risley prism 132.

The optical coupler 131 may combine the laser signals generated by respective laser diodes 124 and output the laser signals to the Risley prism 132. In addition, the Risley prism 132 may emit each of a plurality of laser signals output by being combined by the optical coupler 131 by refracting the laser signal at a different angle according to the frequency.

Accordingly, a plurality of laser signals having different frequencies for the same light identification data can be simultaneously transmitted toward different measurement points.

Figure 4:
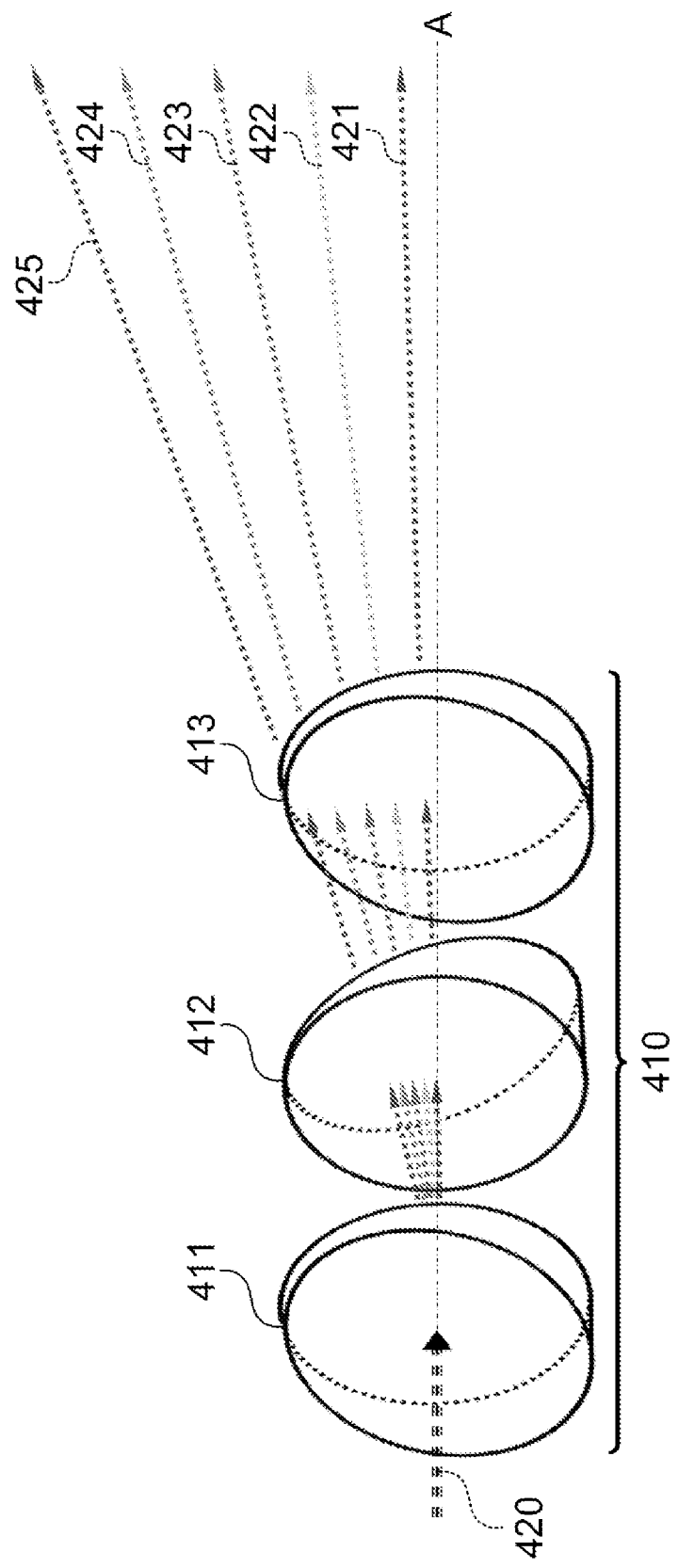
FIG. 4 is a diagram for describing laser signals simultaneously transmitted by the transmission unit according to an embodiment.

Specifically, FIG. 4 is a diagram for describing laser signals simultaneously transmitted by the transmission unit 130 according to an embodiment.

In the example illustrated in FIG. 4, it is assumed that five laser signals having different frequencies for the same optical identification data are generated by the optical modulation unit 120.

As illustrated in the example illustrated in FIG. 4, the Risley prism 410 is composed of a plurality of wedge prisms 411, 412, and 413 arranged in a line on the central axis A and rotated around the central axis A.

Meanwhile, a plurality of laser signals 420 that are combined and output by the optical coupler 131 are incident on the Risley prism 410 along the central axis A of the Risley prism 410 through an optical cable.

Thereafter, the plurality of laser signals 420 incident onto the Risley prism 410 are transmitted by being refracted at different angles depending on respective frequencies. That is, each of the five laser signals transmitted from the prism 410 has a different transmission angle with the central axis A of the Risley prism 410 as a reference and the frequency is also different.

Meanwhile, according to an embodiment, the transmission unit 130 may change the transmission direction after simultaneously transmitting the plurality of laser signals generated from the same optical identification data to different measurement points. In this case, a change in the transmission direction change may be performed by changing at least one of the rotation angle of the Risley prism with the central axis A of the Risley prism 410 as the rotation axis and the direction of the central axis A of the Risley prism 410.

Figure 5:
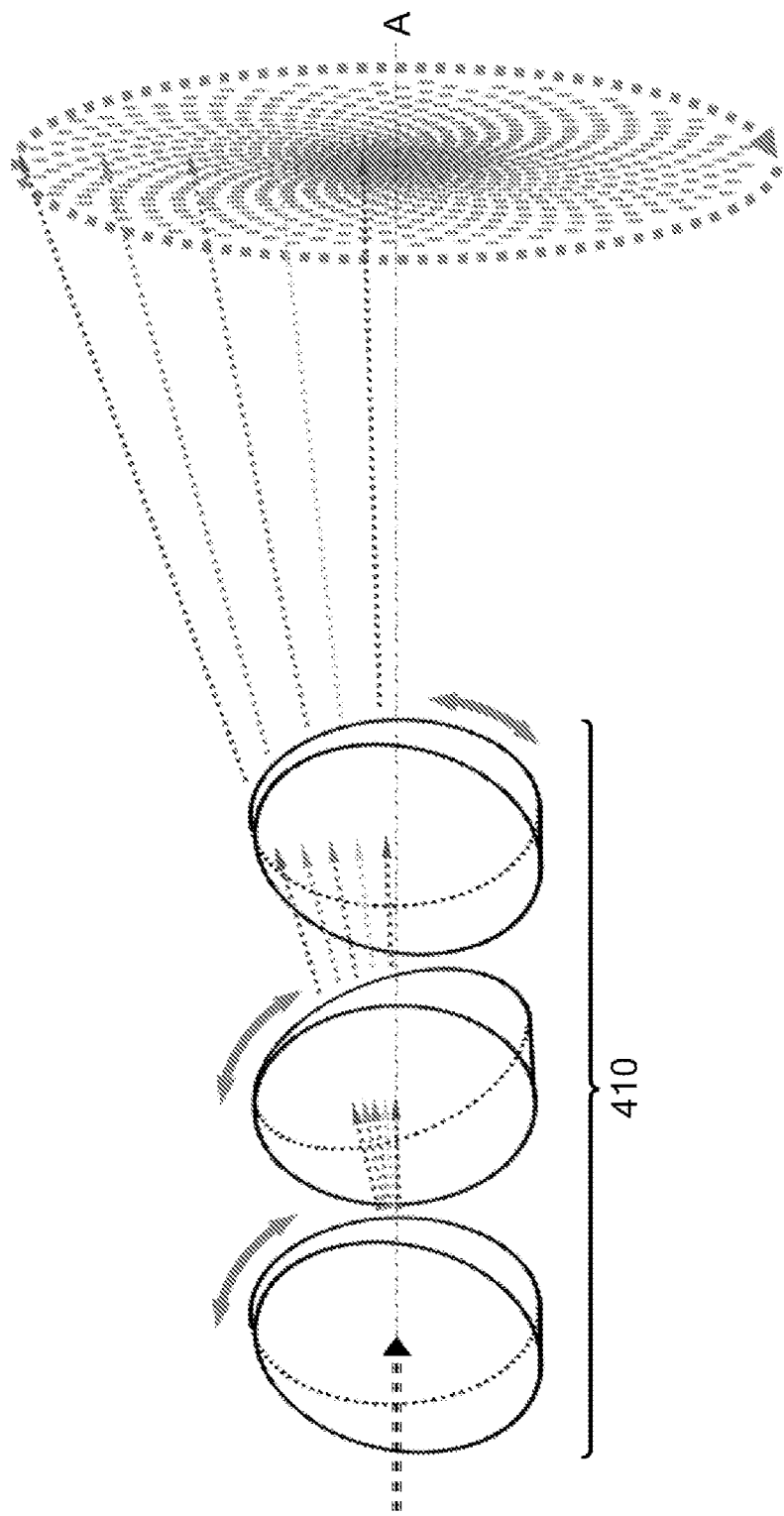
FIGS. 5 and 6 are diagrams for describing a change in a transmission direction according to an embodiment.
Figure 6:
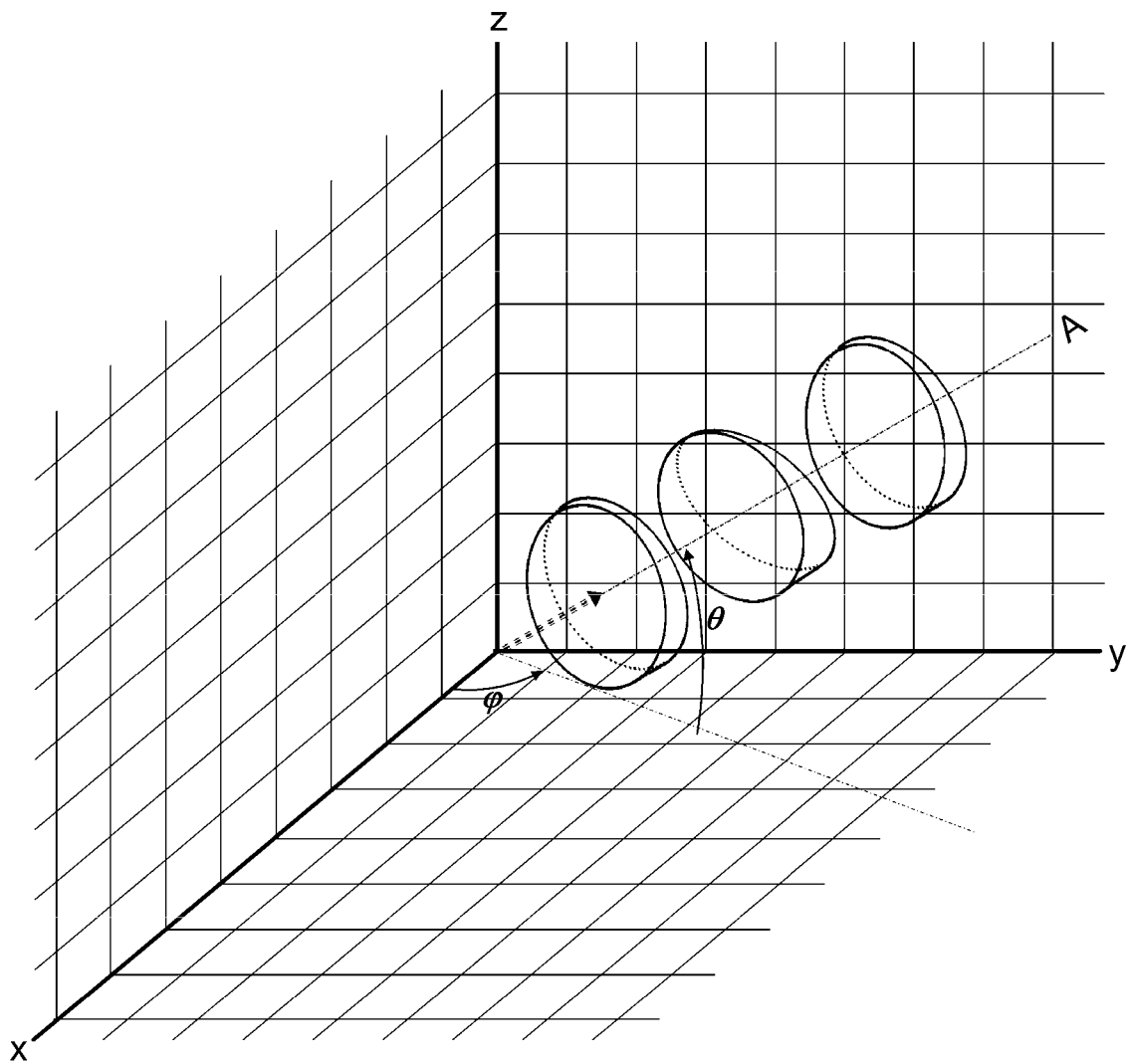

Specifically, FIGS. 5 and 6 are diagrams for describing a change in a transmission direction according to an exemplary embodiment.

As illustrated in the example illustrated in FIG. 5, the transmission unit 130 may change the transmission direction of the plurality of laser signals simultaneously transmitted to different measuring points through the Risley prism 410 by rotating the Risley prism 410 by a preset size with the central axis A of the Risley prism 410 as the rotation axis.

In addition, as in the example illustrated in FIG. 6, the transmission unit 130 may change the direction of the central axis A in the three-dimensional space by changing at least one of the angles φ and θ of the central axis A of the Risley prism 410 by a preset size in a three-dimensional space, and accordingly, the transmission direction of the plurality of laser signals simultaneously transmitted to different measurement points through the Risley prism 410 may be changed.

Meanwhile, when the transmission direction of the plurality of laser signals simultaneously transmitted by the transmission unit 130 is changed, the data generation unit 110 may generate new light identification data.

FIG. 7 is a flowchart of a method of transmitting a laser signal according to an embodiment.

The method illustrated in FIG. 7 may be performed, for example, by the LIDAR sensor device 100 illustrated in FIG. 1.

Referring to FIG. 7, the LIDAR sensor device 100 first generates light identification data (710).

In this case, according to an embodiment, the optical identification data may include first identification data randomly generated as the transmission direction of the plurality of laser signals simultaneously transmitted is changed.

In addition, according to an embodiment, the optical identification data may further include second identification data maintained irrespective of the change in the transmission direction of the plurality of laser signals simultaneously transmitted.

Thereafter, the LIDAR sensor device 100 generates a plurality of modulated signals by performing OFDM modulation on the generated light identification data (720).

In this case, according to an embodiment, the LIDAR sensor device 100 may randomly select N subcarrier frequencies (where, N is a natural number of 0<N<S) among S (where S is a natural number of S>2) available subcarrier frequencies, and generate each of the plurality of modulated signals for the optical identification data by performing OFDM modulation on the optical identification data using N subcarrier signals respectively corresponding to the N subcarrier frequencies.

In addition, according to an embodiment, OFDM modulation performed on optical identification data may be FHT-based flip-OFDM modulation.

In addition, according to an embodiment, each of the plurality of modulated signals may include a zero-padding region having a length greater than or equal to the time required to change the transmission direction of the plurality of laser signals simultaneously transmitted.

Thereafter, the LIDAR sensor device 100 converts the generated plurality of modulated signals into a plurality of laser signals having different frequencies, respectively (730).

In this case, according to an embodiment, the LIDAR sensor device 100 may convert each of the plurality of modulated signals into a laser signal having a different frequency using the plurality of laser diodes 124 each generating the laser signal having the different frequency.

Thereafter, the LIDAR sensor device 100 simultaneously transmits the converted plurality of laser signals to different measurement points according to frequencies (740).

Specifically, according to an embodiment, the LIDAR sensor device 100 may combine the plurality of laser signals using the optical coupler 131. In addition, the LIDAR sensor device 100 may transmit the plurality of laser signals, which are output by being combined with the optical coupler 131, by refracting the plurality of laser signals at different angles depending on the frequencies using the Risley prism 132.

Thereafter, the LIDAR sensor device 100 determines whether or not the scan is finished (750), and if the scan is not finished, changes the transmission direction (760), and then repeats steps 710 to 760 until the scan is finished.

In this case, according to an embodiment, the change in the transmission direction can be performed by changing at least one of a rotation angle of the Risley prism 132 obtained by using the central axis of the Risley prism 132 as the rotation axis and the direction of the central axis of the Risley prism 132.

Although the present invention has been described in detail through the exemplary embodiments above, a person of ordinary skill in the art to which the present invention pertains will understand that various modifications can be made to the above-described embodiments without departing from the scope of the present invention. Therefore, the scope of rights of the present invention is limited to the described embodiments and should not be determined, and should be determined not only by the claims to be described later, but also by those equivalents to the claims.

What is claimed is:

1. A lidar sensor device comprising:
a data generation unit that generates light identification data;
an optical modulation unit that generates a plurality of modulated signals for the optical identification data by performing orthogonal frequency division multiplexing (OFDM) modulation on the optical identification data, and generates a plurality of laser signals respectively corresponding to the plurality of modulated signals and having different frequencies; and
a transmission unit that simultaneously transmits the plurality of laser signals to different measurement points according to the frequencies, respectively,
wherein the transmission unit comprises:
an optical coupler that combines the plurality of laser signals; and
a Risley prism onto which the plurality of laser signals combined by the optical coupler are incident and which transmits the plurality of laser signals by refracting the plurality of laser signals at different angles depending on the frequency,
wherein the optical modulation unit randomly selects N subcarrier frequencies among S available subcarrier frequencies, where, N is a natural number of 0<N<S, and S is a natural number of S>2, and generates each of the plurality of modulated signals by performing OFDM modulation on the optical identification data using N subcarrier signals respectively corresponding to the N subcarrier frequencies.

2. A lidar sensor device comprising:
a data generation unit that generates light identification data,
an optical modulation unit that generates a plurality of modulated signals for the optical identification data by performing orthogonal frequency division multiplexing (OFDM) modulation on the optical identification data, and generates a plurality of laser signals respectively corresponding to the plurality of modulated signals and having different frequencies; and
a transmission unit that simultaneously transmits the plurality of laser signals to different measurement points according to the frequencies, respectively,
wherein the transmission unit comprises:
an optical coupler that combines the plurality of laser signals; and
a Risley prism onto which the plurality of laser signals combined by the optical coupler are incident and which transmits the plurality of laser signals by refracting the plurality of laser signals at different angles depending on the frequency,
wherein the optical modulation unit generates the plurality of modulated signals by performing fast Hartley transform (FHT)-based flip-OFDM modulation on the optical identification data.

3. The lidar sensor device of claim 1, wherein the plurality of modulated signals comprises a zero-padding region having a length greater than or equal to a time required to change a transmission direction of the plurality of laser signals.

4. The lidar sensor device of claim 1, wherein the transmission unit changes a transmission direction of the plurality of laser signals by changing at least one of a rotation angle of the Risley prism using a central axis of the Risley prism as the rotation axis and a direction of the central axis.

5. The lidar sensor device of claim 4, wherein the data generation unit generates new light identification data when the transmission direction is changed.

6. The lidar sensor device of claim 5, wherein the optical identification data comprises first identification data randomly generated as the transmission direction is changed.

7. The lidar sensor device of claim 6, wherein the optical identification data further comprises second identification data maintained irrespective of a change in the transmission direction.

8. The lidar sensor device of claim 1, wherein the data generation unit encrypts the optical identification data, and the optical modulation unit generates the plurality of modulated signals by performing the OFDM modulation on the encrypted optical identification data.

9. A method of transmitting a laser signal comprising:
(a) generating light identification data;
(b) generating a plurality of modulated signals for the optical identification data by performing orthogonal frequency division multiplexing (OFDM) modulation on the optical identification data;
(c) generating a plurality of laser signals respectively corresponding to the plurality of modulated signals and having different frequencies; and
(d) simultaneously transmitting the plurality of laser signals to different measurement points according to the frequencies, respectively,
wherein the step (d) comprises:
combining the plurality of laser signals using an optical coupler; and
transmitting the plurality of laser signals combined by the optical coupler by refracting the plurality of laser signals at different angles depending on the frequency using a Risley prism,
wherein, in the step (b), N subcarrier frequencies is randomly selected among S available subcarrier frequencies, where, N is a natural number of 0<N<S, and S is a natural number of S >2, and each of the plurality of modulated signals is generated by performing OFDM modulation on the optical identification data using N subcarrier signals respectively corresponding to the N subcarrier frequencies.

10. The method of claim 9, wherein the plurality of modulated signals comprise a zero-padding region having a length greater than or equal to a time required to change a transmission direction of the plurality of laser signals.

11. The method of claim 9, further comprising:
(e) changing a transmission direction of the plurality of laser signals by changing at least one of a rotation angle of the Risley prism using a central axis of the Risley prism as the rotation axis and a direction of the central axis, after the step (d).

12. The method of claim 11, further comprising:
generating new light identification data when the transmission direction is changed,
wherein the (b) to (d) steps are performed on the new light identification data.

13. The method of claim 12, wherein the optical identification data comprises first identification data randomly generated as the transmission direction is changed.

14. The method of claim 13, wherein the optical identification data further comprises second identification data maintained irrespective of a change in the transmission direction.

15. The method of claim 9, wherein the (a) step comprises encrypting the optical identification data and, in the (b) step, the plurality of modulated signals are generated by performing the OFDM modulation on the encrypted optical identification data.

\* \* \* \* \*